United States Patent
Dong et al.

(10) Patent No.: US 8,077,821 B2
(45) Date of Patent: Dec. 13, 2011

(54) OPTIMIZED TIMING RECOVERY DEVICE AND METHOD USING LINEAR PREDICTOR

(75) Inventors: Ping Dong, Cupertino, CA (US); Jordan Christopher Cookman, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 989 days.

(21) Appl. No.: 11/527,084

(22) Filed: Sep. 25, 2006

(65) Prior Publication Data

US 2008/0075215 A1    Mar. 27, 2008

(51) Int. Cl.
*H04L 7/00* (2006.01)
*H04L 27/10* (2006.01)
*H04J 3/22* (2006.01)

(52) U.S. Cl. .......... 375/371; 375/233; 370/545
(58) Field of Classification Search .......... 375/371, 375/233; 370/545
See application file for complete search history.

(56) References Cited

U.S. PATENT DOCUMENTS

| | | | | |
|---|---|---|---|---|
| 4,520,499 | A | | 5/1985 | Montlick et al. |
| 5,134,578 | A | * | 7/1992 | Garverick et al. ............ 708/605 |
| 5,138,662 | A | * | 8/1992 | Amano et al. ................ 704/219 |
| 5,781,461 | A | * | 7/1998 | Jaffe et al. .................... 708/301 |
| 5,798,724 | A | * | 8/1998 | Myers .......................... 341/146 |
| 5,909,466 | A | | 6/1999 | Kazunori et al. |
| 5,917,869 | A | | 6/1999 | Larsson |
| 6,091,932 | A | * | 7/2000 | Langlais ....................... 725/111 |
| 6,356,569 | B1 | * | 3/2002 | Sonalkar et al. ............. 370/545 |
| 6,778,621 | B1 | * | 8/2004 | Wilson et al. ................ 375/371 |
| 6,876,699 | B1 | * | 4/2005 | Chadha et al. ............... 375/233 |
| 7,027,500 | B1 | | 4/2006 | Casas et al. |
| 7,433,817 | B2 | * | 10/2008 | Kjorling et al. .............. 704/229 |
| 2002/0150059 | A1 | * | 10/2002 | Blake ........................... 370/286 |
| 2004/0213362 | A1 | * | 10/2004 | Townshend ................. 375/340 |
| 2005/0018798 | A1 | | 1/2005 | Li |
| 2005/0101244 | A1 | * | 5/2005 | Lipka et al. ..................... 455/1 |
| 2005/0264922 | A1 | * | 12/2005 | Erden et al. ................ 360/78.04 |
| 2006/0036432 | A1 | | 2/2006 | Kjorling et al. |

OTHER PUBLICATIONS

LeBlanc, James P. et al., Blind Adapted, Pre-Whitened Constant Modulus Algorithm, IEEE International Conference on Communications (2001) 5 pp.
Larimore, M.U. et al., Recursive Linear Prediction for Clock Synchronization, IEEE International Conference on Acoustics, Speech, and Signal Processing, pp. 572-575, Apr. 1981.
Gardner, Floyd M., Interpolation in Digital Modems-Part I: Fundamentals, IEEE Transactions on Communications, vol. 41, No. 3, pp. 501-507, Mar. 1993.
Kim, Daeyoung et al., Design of Optimal Interpolation Filter for Symbol Timing Recovery, IEEE Transactions on Communications, vol. 45, No. 3, pp. 877-884, Jul. 1997.
Godard, Dominique N., Passband Timing Recovery in an All-Digital Modem Receiver, IEEE Transactions on Communications, vol. 26, No. 5, pp. 517-523, May 1978.

* cited by examiner

*Primary Examiner* — David C. Payne
*Assistant Examiner* — Sarah Hassan
(74) *Attorney, Agent, or Firm* — Fulbright & Jaworski L.L.P.

(57) ABSTRACT

In accordance with a method and apparatus of the present invention, a timing recovery device is disclosed to include a timing correction module responsive to a sampled input signal and adapted to generate a time-corrected signal and to further include a linear predictor coupled to the timing correction module for filtering the time-corrected signal to generate a whitened output signal and to further include a timing update module responsive to the whitened output signal for updating at least one parameter in the timing correction module.

29 Claims, 8 Drawing Sheets

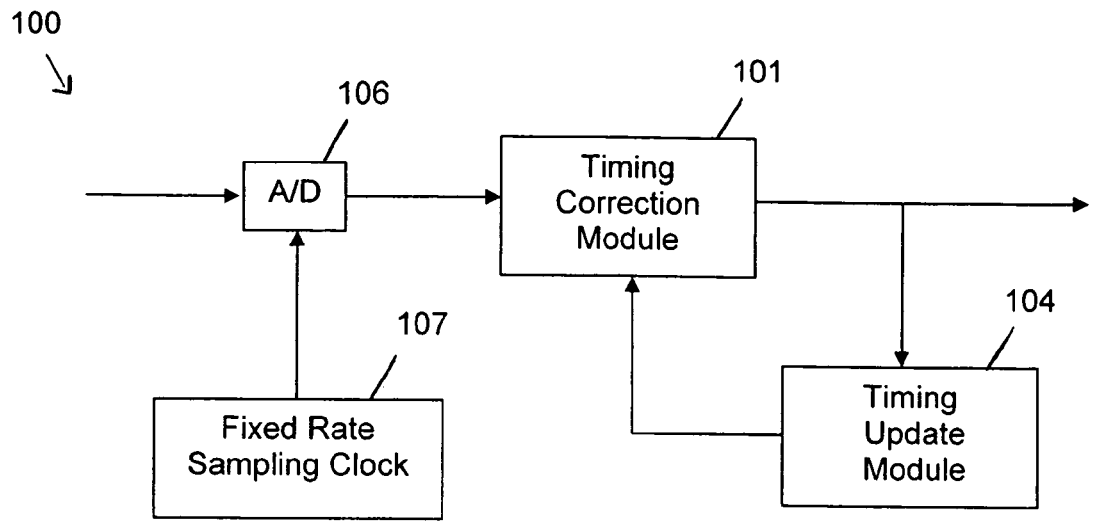
*Fig. 1a – Prior Art*
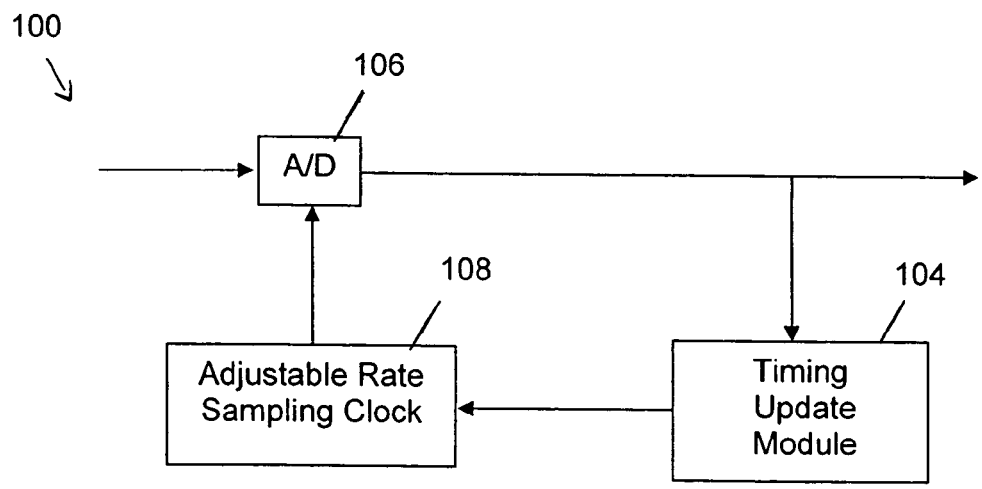
*Fig. 1b – Prior Art*

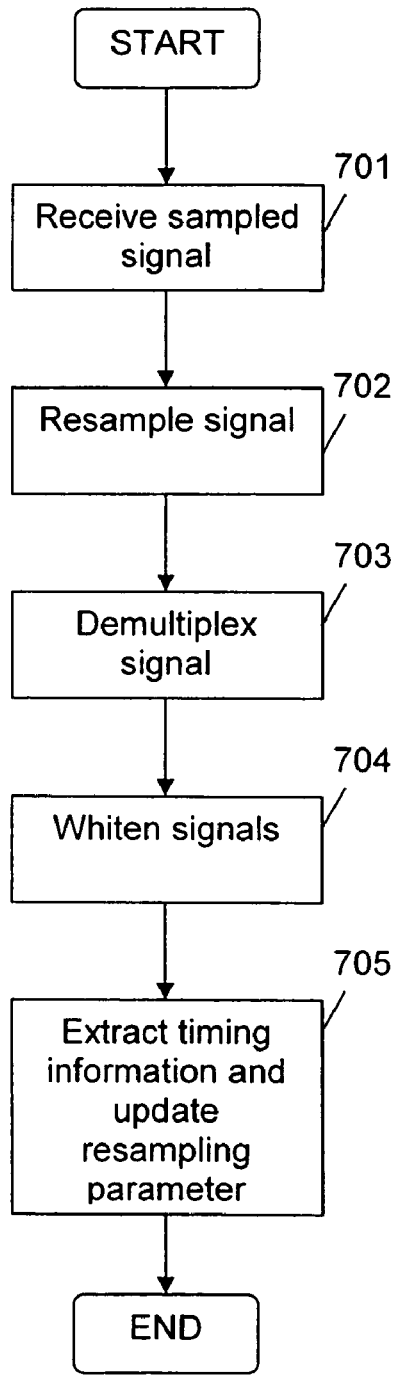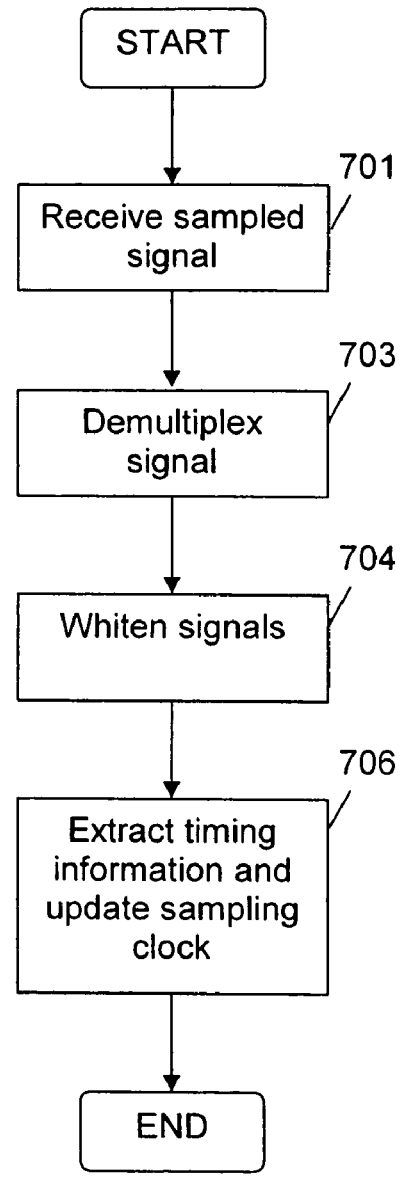
Fig. 7a
Fig. 7b

OPTIMIZED TIMING RECOVERY DEVICE AND METHOD USING LINEAR PREDICTOR

BACKGROUND OF THE INVENTION

1. Field of the Invention

The present invention relates generally to communication systems having receivers for receiving signals of one or more communication channels and particularly to a timing recovery device used in the receiver of a communication system causing 'whitening' to reduce the effects of fading in communication channels.

2. Description of the Prior Art

Timing recovery is a vital part of a communication system because it is the process of synchronizing a local receiver to a remote transmitter. Linear predictors have been used in communication systems due to their ability to pre-whiten a signal before blind adaptive equalization. That is, equalization of a communication channel, carrying a signal to be received and demodulated, is improved in a receiver using a linear predictor. An example of such use for the case of Constant Modulus Algorithm (CMA) blind adaptation is described in the paper "Blind adapted, pre-whitened constant modulus algorithm," by James P. LeBlanc and Inbar Fijalkow, presented at IEEE International Conference on Communications, 2001, and incorporated here by reference. Systems that use linear prediction in the context of blind adaptive equalization are disclosed in U.S. Pat. No. 5,909,466 to Labat et. al., and U.S. Pat. No. 7,027,500 to Casas et. al.

Linear prediction has also been proposed in its recursive lattice configuration for use in a timing recovery system for magnetic recording. This application is described in "Recursive Linear Prediction for Clock Synchronization," by M. U. Larimore and B. J. Langland, presented at IEEE International Conference on Acoustics, Speech, and Signal Processing, April, 1981, and incorporated here by reference.

Timing recovery is accomplished by analog, digital, or mixed analog and digital means. A conventional digital timing recovery architecture, as illustrated in FIG. 1a, includes a timing recovery module 100 including an A/D converter 106, a fixed rate sampling clock 107, a timing correction module 101 and a timing update module 104. The A/D converter 106 samples a received signal, carried by a communication channel, at a fixed rate determined by the fixed rate sampling clock 107. The sampling rate is not synchronized to a remote transmitter but such synchronization is necessitated, otherwise, the transmitted signal cannot be accurately recovered. The timing correction module 101 re-samples the signal at a rate synchronized to a remote transmitter. The synchronized signal is processed by the timing update module 104, which updates one or more parameters in the timing correction module 101 in order to maintain synchronization.

The output of the timing correction module 101 is a synchronous sampled signal whose sampling rate is synchronized to a remote transmitter. In general, the timing correction module 101 uses interpolation techniques, known to those skilled in the art, to generate the synchronous sampled signal. The publication "Interpolation in Digital Modems-Part I: Fundamentals," by Floyd M. Gardner, IEEE TRANSACTIONS ON COMMUNICATIONS, VOL. 41, NO. 3, MARCH 1993, provides more information about this architecture. The publication "Design of Optimal Interpolation Filter for Symbol Timing Recovery," by Daeyoung Kim, Madihally J. Narasimha, and Donald C. Cox, IEEE TRANSACTIONS ON COMMUNICATIONS, VOL. 45, NO. 7, JULY 1997, discusses the interpolation filter design in particular. Both publications are incorporated herein by reference.

A conventional mixed analog and digital timing recovery architecture, as illustrated in FIG. 1b, includes a timing recovery module 100 including an A/D converter 106, an adjustable rate sampling clock 108, and a timing update module 104. The A/D converter 106 samples a signal carried by a communication channel at an adjustable rate determined by the adjustable rate sampling clock 108. The sampled signal is processed by the timing update module 104, which adjusts the adjustable rate sampling clock 108 in order to maintain synchronization.

The timing update module 104 of FIG. 1a or FIG. 1b may use blind or decision-directed techniques to update one or more parameters in the timing correction module 101 of FIG. 1a, or to adjust the adjustable rate sampling clock 108 of FIG. 1b. Blind techniques are often preferred because they avoid the long delay of an equalizer in the timing loop, and they can be employed when reliable decisions are unavailable. Conventional blind techniques rely on excess bandwidth (signal energy above the Nyquist band-edges) to extract timing error information. These will be referred to hereafter as "band-edge timing recovery" techniques. One such technique is described in the publication "Passband Timing Recovery in an All-Digital Modem Receiver" by Dominique N. Godard, IEEE TRANSACTIONS ON COMMUNICATIONS, VOL. 26, NO. 5, MAY 1978.

It is worthy to note that band-edge timing recovery techniques must operate at a sampling rate higher than the Nyquist rate of the transmitted signal in order to retain excess bandwidth information. More specifically, band-edge timing recovery requires higher than Nyquist sampling rate. Therefore, all signal processing operations in the timing loop have to operate at a rate higher than Nyquist sampling rate. This is in contrast to a conventional linear predictor used for blind equalization, which can operate at the Nyquist sampling rate (symbol rate.)

In a receiver, the output of the timing recovery module 100 is typically connected to an equalizer module (not shown in FIG. 1a or 1b). The equalizer may operate at the Nyquist rate, in which case it is known as a symbol-spaced or T-spaced equalizer. In that case, the signal must be down-sampled after timing recovery, and the timing update module 104 must not only synchronize the local receiver's sampling rate to a remote transmitter, it must also select the optimum down-sampling phase. If the wrong phase is chosen, symbol-spaced equalizer performance can be significantly degraded. The issue can be avoided by operating the equalizer at a rate higher than Nyquist (also known as fractionally-spaced equalization), but this increases the size and cost of the receiver.

In most practical communication systems, the transmitted signal is distorted by a communication channel before reaching the receiver. For example, in terrestrial digital television, the transmitted signal may reach the receiver via several different paths. This is known as "multipath distortion." In some cases, the communication channel may severely attenuate the signal frequency components near its Nyquist band-edges thereby degrading the performance of band-edge timing recovery techniques.

Therefore, the need arises for an optimized timing recovery (or correction) device and method that improves the performance of band-edge timing recovery techniques when the Nyquist band-edges of the signal are degraded by the communication channel.

SUMMARY OF THE INVENTION

Briefly, a timing recovery device is disclosed for receiving a sampled input signal and including a linear predictor coupled between a timing correction module and a timing update device, the timing correction module being responsive to the sampled input signal and adaptive to generate a time-corrected signal, the linear predictor responsive to the time-corrected signal and for whitening the time-corrected signal, the timing update device for processing the whitened signal and for updating at least one parameter in the timing correction device.

One method of the present invention includes the steps of receiving a sampled signal, re-sampling the sampled signal to produce a time-corrected signal, whitening the time-corrected signal to produce a whitened signal, and processing the whitened signal to extract timing information and updating at least one parameter for a subsequent re-sampling step.

The foregoing and other objects, features and advantages of the invention will no doubt become apparent after reading the following detailed description of the preferred embodiments, which is illustrated in the several figures of the drawing.

IN THE DRAWINGS

FIG. 1a illustrates a prior art timing recovery module.

FIG. 1b shows another prior art timing recovery module.

FIG. 7a illustrates another exemplary timing recovery method.

FIG. 7b shows another exemplary timing recovery method.

DETAILED DESCRIPTION OF THE PREFERRED EMBODIMENTS

Figure 2:
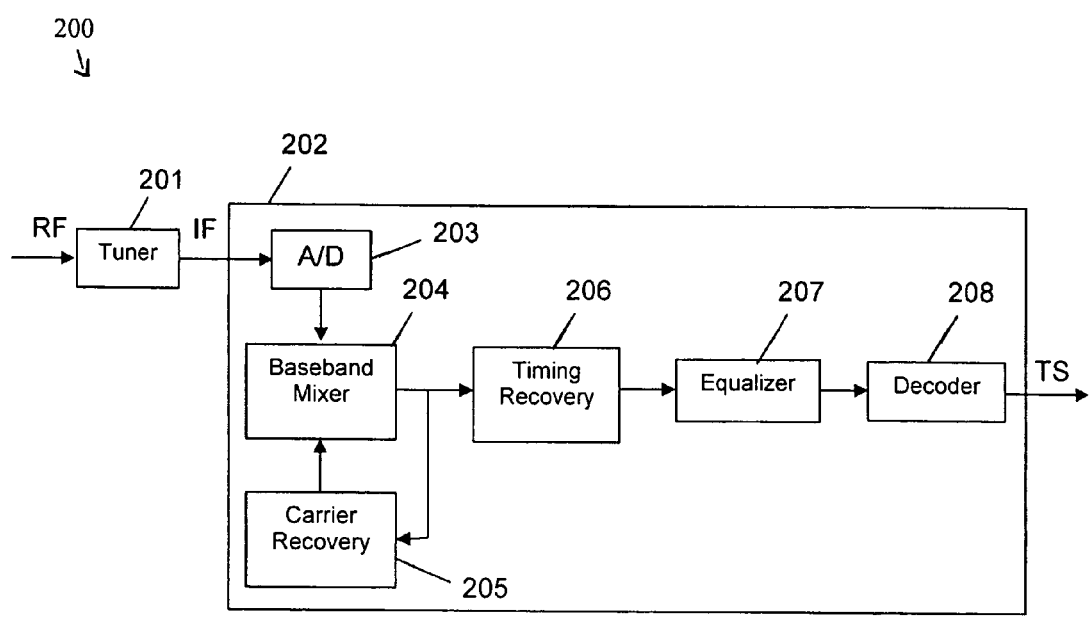
FIG. 2 shows a block diagram of an application, a digital terrestrial television receiver, of a timing recovery device in accordance with an embodiment of the present invention.

Referring now to FIG. 2, a block diagram of an example application, a digital terrestrial television receiver 200 including a timing recovery device 206 is shown in accordance with an embodiment of the present invention. As an example, the receiver 200 is used to receive digital terrestrial television signals broadcast according to Advanced Television Systems Committee (ATSC) standard A/53. Included within the receiver 200 is a demodulator Integrated Circuit (IC) 202, which is shown to include an analog-to-digital (A/D) converter 203, a baseband mixer 204, a carrier recovery circuit 205, a timing recovery device 206, an equalizer 207, and a decoder 208. The IC 202 is shown coupled to a tuner 201, which provides intermediate frequency (IF) signals to the IC 202 and receives as its input radio frequency (RF) signals from a communication channel. The A/D converter 203 is shown coupled to the mixer 204, which is shown coupled to the carrier recovery circuit 205. The mixer 204 and the carrier recovery circuit 205 are shown coupled to the timing recovery device 206, which is, in turn, shown coupled to the equalizer 207. The equalizer 207 is shown coupled to the decoder 208 and the latter provides an output Transport Stream (TS).

In FIG. 2, the tuner 201 is shown to receive a RF signal for down-conversion to an IF signal and providing the IF signal to the A/D converter 203 of the IC 202. The IC 202 processes the IF signal to produce a digital video TS. The A/D converter 203 samples the analog IF signal at a rate not synchronized to a remote transmitter (not shown in FIG. 2), to produce a digital IF signal and provides the same to the baseband mixer 204. The baseband mixer 204 down-converts the digital IF signal to baseband and provides the down-converted baseband signal to the timing recovery device 206. The carrier recovery circuit 205 synchronizes the baseband mixer 204 to the IF carrier.

The timing recovery device 206 re-samples the down-converted baseband signal at a rate synchronized to the remote transmitter, automatically updating its re-sampling rate to maintain synchronization. The equalizer 205 removes multi-path distortion and other forms of inter-symbol interference (ISI) from the signal. The decoder 106 performs trellis decoding, de-interleaving, forward error correction, de-randomizing, and other functions to produce the digital video TS. It will be understood that other processing blocks not illustrated in FIG. 2 may be within the demodulator IC 202, including but not limited to an Automatic Gain Control (AGC), digital filters, and various synchronization circuits. It will also be understood that the embodiments of the present invention are applicable to other types of communication systems and other receiver configurations than that illustrated in FIG. 2.

In order to improve band-edge timing recovery performance when Nyquist band-edges are attenuated in the communication channel, a linear predictor to whiten the signal is employed in timing recovery. It should be noted that while linear predictors have been used, in prior art techniques, to pre-whiten, this application is known only for equalization and not timing recovery. Unlike the system proposed by Larimore and Langland, the linear predictor of the embodiments of the present invention is used to whiten the signal, not to extract timing information.

Figure 3A:
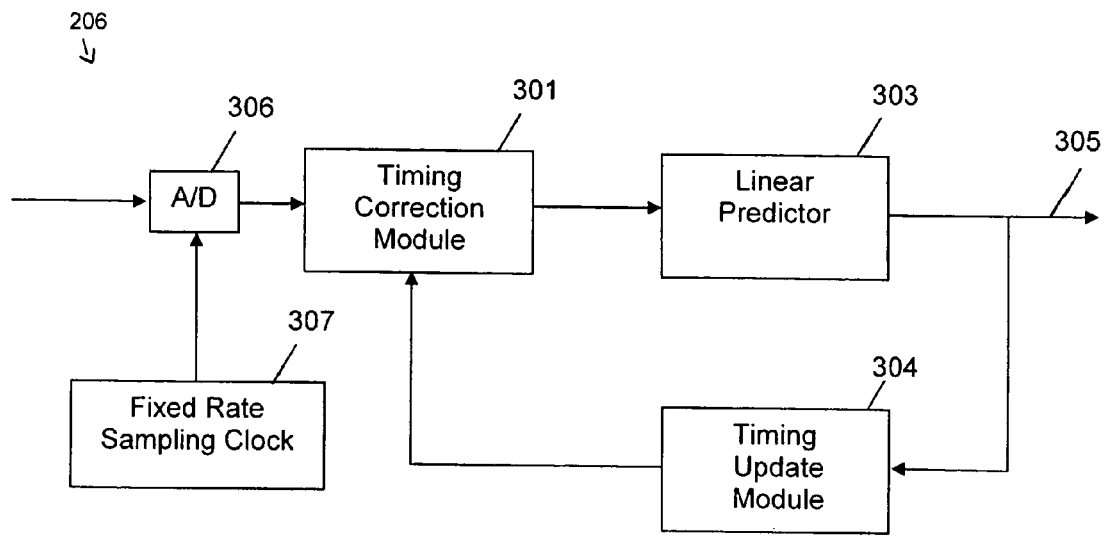
FIG. 3 shows a high-level block diagram of a timing recovery device in accordance with an embodiment of the present invention.

In FIG. 3a, the timing recovery device 206, of FIG. 2, is shown in greater block diagram detail, in accordance with an embodiment of the present invention. The timing recovery device 206 is shown to include a timing correction module 301 coupled to a linear predictor 303, which is, in turn, shown coupled to a timing update module 304. The timing correction module 301 receives an asynchronous sampled signal as input from the A/D converter 306. The sampling rate of the asynchronous sampled signal is not synchronized to a remote transmitter and therefore must be synchronized. The timing correction module 301 re-samples the signal at a rate synchronized to a remote transmitter to generate a time-corrected signal. The time-corrected signal is processed by the linear predictor 303, which "whitens" the signal. The A/D converter 306 is shown coupled to a fixed rate sampling clock 307 for sampling input provided thereto as a fixed rate.

'Whitening', refers to modifying the frequency spectrum of a signal so that it has approximately equal energy at every frequency within its bandwidth. It is so named because 'white' light has equal energy at every frequency within the bandwidth of visible light. After whitening, the whitened signal is processed by the timing update module 304 that updates one or more parameters in the timing correction module 301 in order to maintain synchronization. Examples of parameters include, but are not limited to, interpolation phase and frequency, interpolation filter coefficients, an index to a table of interpolation filters, and the like as known to those skilled in the art.

The linear predictor 303 is a type of digital filter and uses coefficients to generate a sum of coefficients multiplied with the sampled signal, an example of which will be shortly provided relative to subsequent figure(s). The coefficients of the linear predictor 303 are, in one embodiment, fixed based upon a priori knowledge of the communication channel, in another embodiment learned during a startup procedure, or in another embodiment continuously adapted.

In prior art digital terrestrial television applications, there are no startup procedures. Therefore, in embodiments of the present invention related to digital terrestrial television, the linear predictor coefficients are continuously adapted using a blind criterion. In other types of communication systems, like DSL, there is typically a startup procedure. In that case, the predictor coefficients can be learned during startup, and fixed during normal communications.

In one embodiment of the present invention, the output 305 is suitable for use as the input to a fractionally-spaced equalizer (not shown in FIGS. 3a and 3b) or the equalizer 207 of FIG. 2. The output 305 could also be down-sampled and used as the input to a symbol-spaced equalizer. The output 305 could also be provided to another processing module in accordance with other embodiments of the present invention.

Figure 4A:
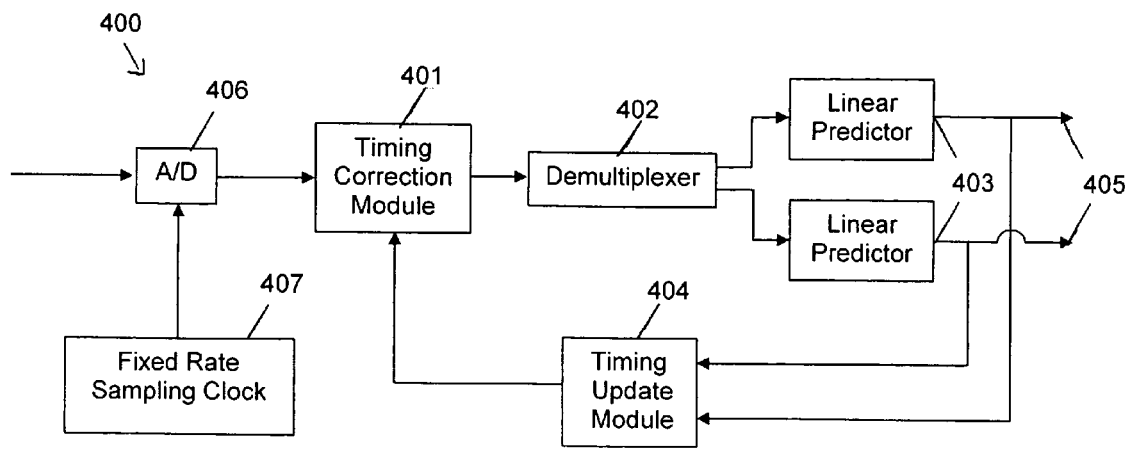
FIG. 4a shows a timing recovery device 400 in accordance with another embodiment of the present invention.

FIG. 4a shows a timing recovery device 400 in accordance with another embodiment of the present invention. In FIG. 4a, the device 400 is shown to include a timing correction module 401 coupled to a demultiplexer 402, which is, in turn, shown coupled to two linear predictors 403. The output of the linear predictors 403 each generate input to the timing update module 404 and are outputs 405 of the timing recovery device 400.

The timing correction module 401 receives an asynchronous sampled signal as input. The received asynchronous sampled signal has a sampling rate that is not synchronized to a remote transmitter. The timing correction module 401 resamples the received asynchronous sample signal at a rate synchronized to a remote transmitter to generate a time-corrected signal. In an alternative embodiment, the sampling rate is an integer multiple of the asynchronous sample signal's Nyquist rate.

The time-corrected signal is demultiplexed by the demultiplexer 402, which separates the time-corrected signal into two or more sub-sampled signals. In an alternative embodiment, the sub-sampling rate is equal to the Nyquist rate of the time-corrected signal. Although only two demultiplexer outputs are illustrated in FIG. 4a, corresponding to an input sampling rate of twice the time-corrected signal's Nyquist rate, the actual number of demultiplexer outputs is equal to an integer multiple used, and may be more than two. Each sub-sampled signal is processed by a linear predictor 403, which generates whitened output signals 405. Note that although only two linear predictors 403 are depicted in FIG. 4a, corresponding to two demultiplexer outputs, the actual number of linear predictors is equal to the number of demultiplexer outputs, and may be more than two.

The coefficients of the linear predictors 403 can be fixed based on a priori knowledge of the channel, learned during a startup procedure, or continuously adapted. After whitening, the sub-sampled signals are processed by a timing update module 404 that updates one or more parameters in the timing correction module in order to maintain synchronization. One of the whitened output signals 405 can be used as the input to a symbol-spaced equalizer (not shown in FIG. 4a). Multiple output signals 405 can also be multiplexed to form the input to a fractionally-spaced equalizer. One or more outputs 405 could also go to other processing modules in accordance with embodiments of the present invention.

Figure 3B:
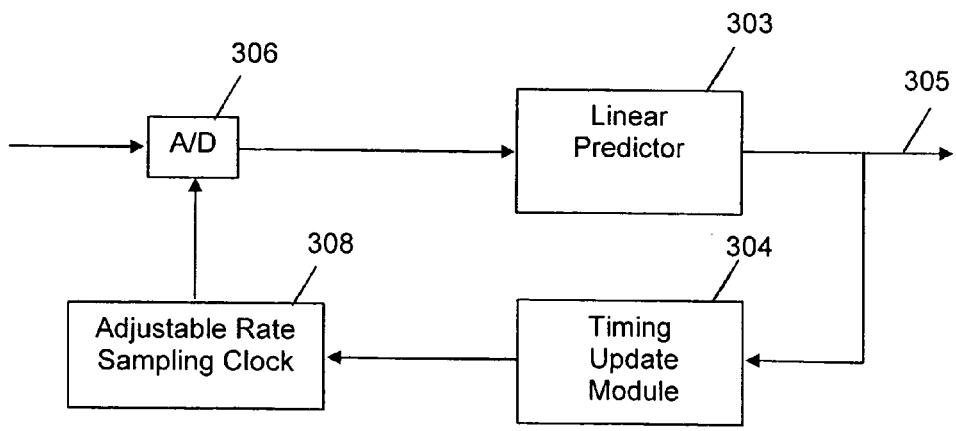

Using multiple linear predictors 403 rather than using one linear predictor 303 as in FIGS. 3a and 3b, can improve the signal quality because depending on the coefficient selection, the linear predictor 303 of FIGS. 3a and 3b can distort the signal at the Nyquist band-edges thereby degrading timing recovery performance. One way to prevent this is to have one set of linear predictor coefficients operating at the Nyquist rate and to apply the same filter to all phases of the signal. This can be accomplished by the embodiments of FIGS. 3a and 3b by repeating the coefficients. However the embodiment of FIG. 4a is a more explicit way of separating the signal into phases and filtering them individually. If the same coefficients are used for each phase, then only one set of coefficients needs to be stored. Thus, the embodiment of FIG. 4a has the advantage of reduced coefficient memory size over the embodiments of FIGS. 3a and 3b.

Figure 4B:
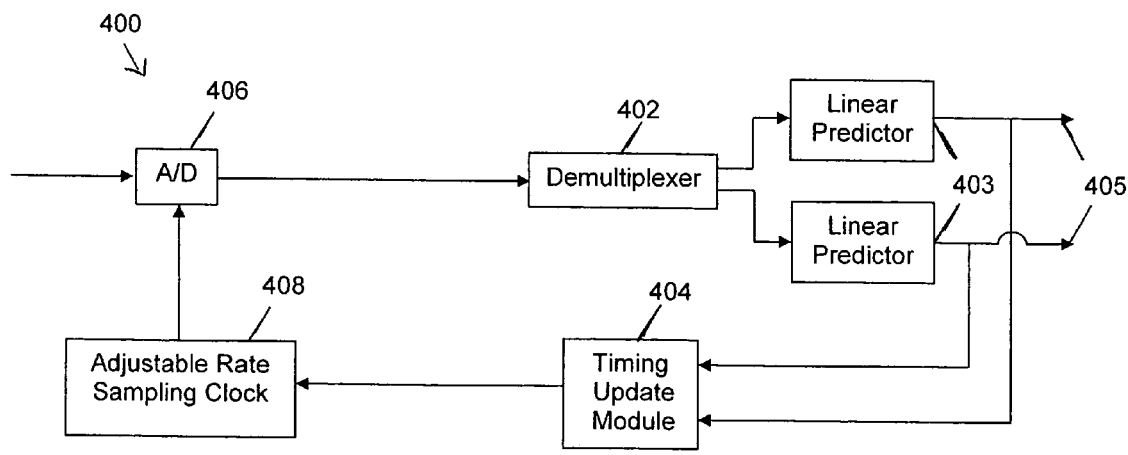
FIG. 4b shows the timing recovery device 400 to include a structure different than the embodiment of FIG. 4a, in accordance with another embodiment of the present invention.

FIG. 4b shows the timing recovery device 400 to include a structure different than the embodiment of FIG. 4a, in accordance with another embodiment of the present invention. Namely, the difference between the device 400 of FIG. 4b and that of FIG. 4a is that the timing update module 404 is shown coupled to an adjustable rate sampling clock 408 and the latter is shown coupled to the A/D converter 406. As noted, the sampling clock in FIG. 4b operates at an adjustable rate whereas the sampling clock of FIG. 4a is fixed. In this respect, the design of the demodulator IC 202 of FIG. 2 is simplified and its cost is reduced. However, the cost of implementing an adjustable rate sampling clock is generally higher than that of implementing a fixed rate sampling clock.

Figure 5:
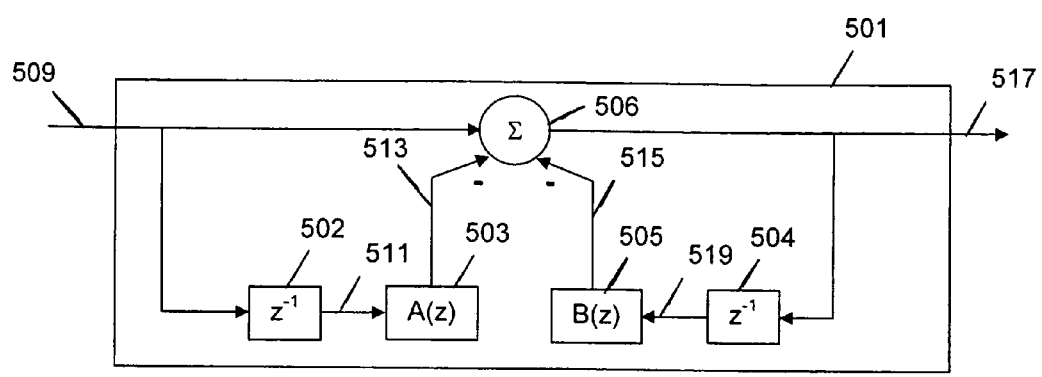
FIG. 5 shows further details of a linear predictor, such as the linear predictor 206 (of FIG. 2), in accordance with an embodiment of the present invention.

FIG. 5 shows further details of a linear predictor, such as the linear predictor 303 (of FIG. 3a), in accordance with an embodiment of the present invention. In FIG. 5, a linear predictor 501 is shown to include an input sample delay element 502, a feedforward predictor filter 503, an output sample delay element 504, a feedback predictor filter 505, and a summing unit 506. The input sample delay element 502 is shown to receive an input and is coupled to the feedforward predictor filter 503, which provides an output to the summing unit 506. The output sample delay element 504 is shown coupled to the feedback predictor filter 505, whose output is provided to the summing unit 506. The output of the summing unit 506 is the output of the linear predictor 501. The input to the input sample delay element 502 is coupled to the summing unit 506. Thus, the summing unit 506 adds/subtracts the three inputs provided thereto.

The input sample delay element 502 delays the input signal 509 by one sample. The delayed input signal 511 is filtered by the feedforward predictor filter 503 to form a first filtered signal 513. The first filtered signal 513 is subtracted from the input signal 509 by the summing unit 506, which also subtracts a second filtered signal 515. The output 517 of the summing unit 506 is the whitened signal. The output sample delay element 504 delays the whitened signal by one sample to form a delayed whitened signal 519. The delayed whitened signal 519 is filtered by the feedback predictor filter 505 to form the second filtered signal 515.

In one embodiment, the predictor filters 503 and 505 are implemented as finite impulse response (FIR) digital filters. Predetermined numbers of coefficients, one number for each polynomial, are used in the polynomials A(z) and B(z) of the filters 503 and 505, respectively, wherein ($z^{-1}$) represents a sample delay. In one exemplary embodiment, the B(z) polynomial is removed, and the A(z) polynomial has 28 coefficients. With B(z) removed, the linear predictor configuration is referred to as 'all-zero.' It is also possible to have the A(z)

polynomial removed with only B(z) remaining, which is an 'all-pole' case. In another embodiment, both A(z) and B(z) polynomials are present. Other polynomial utilizations are anticipated and numerous types of polynomials may be employee.

In an alternative embodiment using an adaptive implementation, the coefficient values of the predictor filters 503 and 505 are initialized to 0 and the whitened signal 517 is used to continuously update said coefficients. One applicable coefficient adaptation technique described in the LeBlanc and Fijalkow publication, referenced hereinabove and used in an exemplary embodiment, is least mean squares (LMS.)

If the timing update module uses band-edge timing recovery techniques, care must be taken in the design of the linear predictor coefficients to ensure that timing information near the Nyquist band-edges of the signal is not distorted. One way of doing so is to use the embodiment illustrated in FIG. 4a, and choose substantially the same linear predictor coefficients for each linear predictor 403. Other solutions, such as compensating linear predictor distortion in the timing update module are contemplated.

Use of the linear predictor of the various embodiments of the present invention has resulted in improving both timing recovery and blind equalization. Without the linear predictor, the blind equalizer will not converge for some channel conditions. One difference between the linear predictor being inside of the timing loop, as in the present invention, and outside of the timing loop, as in the prior art, is reflected in different sampling phases of the whitened signals. If the linear predictor is inside the timing loop, then the optimum sampling phase will always be chosen. If the linear predictor is outside the timing loop, then it has the possibility of changing the sampling phase, if it is implemented at higher than Nyquist sampling rate. The importance of sampling phase, as discussed above, is dependent on the equalizer implementation. If a fractionally spaced equalizer is used, sampling phase is not important. If a symbol-spaced equalizer is used, there can be a significant performance difference between different sampling phases, depending on the channel condition. A second difference between the linear predictor being inside of the timing loop, as in the present invention, and outside of the timing loop, as in the prior art, is reflected in different effective signal to noise ratios (SNR's) of the timing information. The 'noise' in this case is the data content of the signal, which interferes with the timing information embedded in the signal. If the channel has a deep notch around the band-edge, it is more difficult to extract the timing information because the data content is very large relative to the timing information. The linear predictor will increase the effective SNR of the timing information. So, given the same band-edge filter, the timing recovery performance will be better with the linear predictor inside the timing loop, independent of the equalizer.

Figure 8:
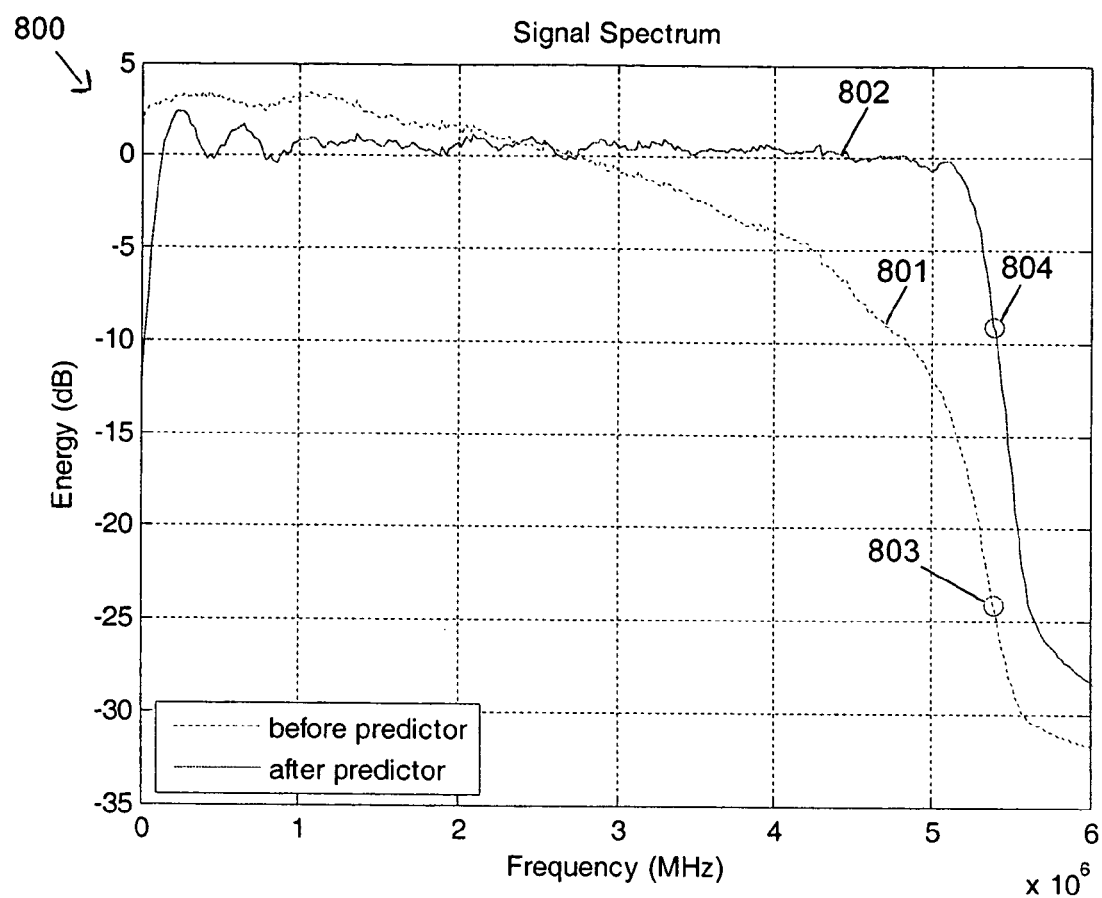
FIG. 8 shows a graph illustrating the benefit of the various embodiments of the present invention by way of an example.

Next, the benefit of the various embodiments of the invention are illustrated by way of an example with reference to the graph of FIG. 8. In this example, the signal is a simulated digital terrestrial television signal, according to ATSC standard A/53. All signals and impairments in this example were generated using a proprietary C code model. FIG. 8 contains a graph 800 of signal energy vs. frequency of the baseband signal after carrier recovery, with DC (0 MHz) representing the pilot frequency as defined in A/53. In this example, the signal has been distorted by a simulated channel consisting of a single echo with 0 dB attenuation, delay of 0.0741 μS, and phase of 99 degrees, all relative to the main path. Such a channel results in severe attenuation of the signal's upper band-edge at approximately 5.38 MHz. The dotted line 801 represents the signal after a timing correction module, such as illustrated in FIG. 3a 301. The solid line 802 represents the signal after a linear predictor, such as illustrated in FIG. 3a 303. The linear predictor was implemented as an adaptive 'all zero' FIR filter with 28 taps, with coefficients updated using an LMS technique. The two lines were generated by averaging 2048 successive outputs of a 1024-point Fast Fourier Transform performed on the respective signals. The simulated sampling rate of the signals was twice the symbol rate, or approximately 21.52 MHz. The 0 dB reference point is selected arbitrarily and the same reference point is used for both signals. The circles 803 and 804 denote the signal energy at the upper band-edge of approximately 5.38 MHz, for the signals before and after linear predictor, respectively. As can be seen from the graph 800, the signal energy before linear predictor is much higher for lower frequencies than for higher frequencies, whereas the signal energy after linear predictor is more consistent across the signal band. In other words, the signal is more 'white' after linear predictor. It can also be seen that the signal after linear predictor has significantly more energy at the upper band-edge than the signal before linear predictor. More importantly, the ATSC A/53 receiver of the said C code model cannot decode the signal if the linear predictor is moved outside the timing loop, whereas with the linear predictor inside the timing loop, it can decode without errors.

Figure 6A:
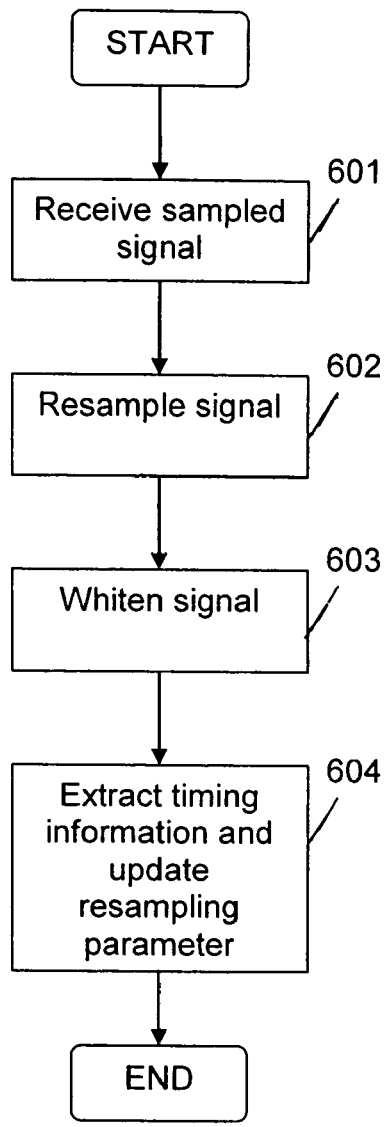
FIG. 6a illustrates an exemplary timing recovery method.

Next, an exemplary timing recovery method will be described with reference to FIG. 6a. In step 601, a sampled signal is received, wherein the sampling rate of the received signal is not synchronized to a remote transmitter. During the step 602, re-sampling of the sampled signal is performed at a rate synchronized to a remote transmitter producing a time-corrected signal. At step 603, whitening is performed of the time-corrected signal using linear prediction techniques to produce a whitened signal. In the step 604, the whitened signal is processed to extract timing information and to update at least one parameter for a subsequent re-sampling step. The method described with reference to FIG. 6a may be performed on a sample-by-sample basis, or on an entire block of samples at once. The method is typically performed in a continuous fashion where upon completion of the step 604, the step 601 is commenced using new samples.

Figure 6B:
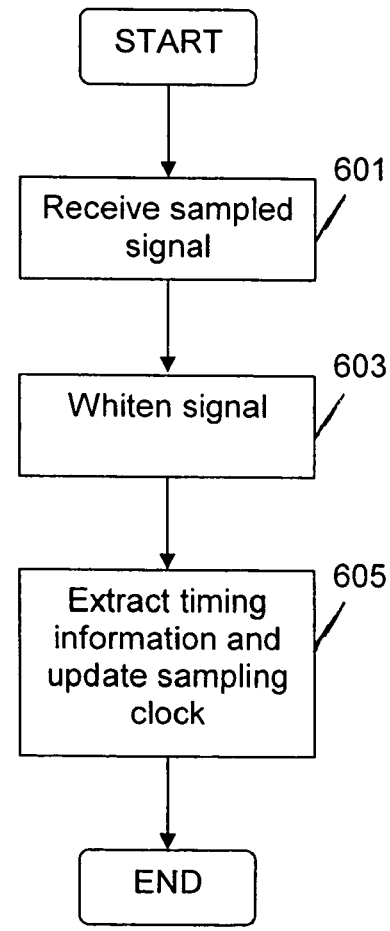
FIG. 6b shows another exemplary timing recovery method.

FIG. 6b shows an exemplary timing recovery method in accordance with another embodiment of the present invention. In step 601, a sampled signal is received, wherein the sampling rate of the received signal is synchronized to a remote transmitter. At step 603, whitening is performed of the time-corrected signal using linear prediction techniques to produce a whitened signal. In the step 605, the whitened signal is processed to extract timing information and to adjust the sampling clock used to generate the sampled signal received in a subsequent step 601. The method described with reference to FIG. 6b may be performed on a sample-by-sample basis, or on an entire block of samples at once. The method is typically performed in a continuous fashion where upon completion of the step 605, the step 601 is commenced using new samples.

Next, another exemplary timing recovery method is described with reference to FIG. 7a. At step 701, a sampled signal is received wherein the sampling rate of the signal is not synchronized to a remote transmitter. At step 702, re-sampling is performed of the sampled signal at a rate synchronized to a remote transmitter, producing a time-corrected signal. Next, during the step 703, demultiplexing is performed on the time-corrected signal to produce two or more sub-sampled signals. At step 704, whitening of the sub-sampled signals is performed using linear prediction techniques to produce two or more whitened sub-sampled signals.

At step 705, the whitened sub-sampled signals are processed to extract timing information and to update at least one parameter for a subsequent re-sampling step. The method described with reference to FIG. 7a may be performed on a sample-by-sample basis, or on an entire block of samples at once. The method is typically performed in a continuous fashion, whereby upon the completion of the final step 705, the first step 701 is commenced using new samples.

FIG. 7b shows an exemplary timing recovery method in accordance with another embodiment of the present invention. At step 701, a sampled signal is received wherein the sampling rate of the signal is synchronized to a remote transmitter. Next, during the step 703, demultiplexing is performed on the time-corrected signal to produce two or more sub-sampled signals. At step 704, whitening of the sub-sampled signals is performed using linear prediction techniques to produce two or more whitened sub-sampled signals. At step 706, the whitened sub-sampled signals are processed to extract timing information and to adjust the sampling clock used to generate the sampled signal received in a subsequent step 701. The method described with reference to FIG. 7b may be performed on a sample-by-sample basis, or on an entire block of samples at once. The method is typically performed in a continuous fashion, whereby upon the completion of the final step 706, the first step 701 is commenced using new samples.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A timing recovery device for use in a receiver of a communication system, comprising:
    a timing correction module responsive to a sampled input signal from an analog-to-digital (A/D) converter, the sampled input signal having a sampling rate not synchronized to a transmitter, the timing correction module adapted to resample the received sampled input signal at a rate synchronized to a transmitter and to generate a time-corrected signal and using at least one parameter for correction;
    a linear predictor coupled to the timing correction module for filtering the time-corrected signal to generate a whitened output signal; and
    a timing update module responsive to the whitened output signal operative to update at least one parameter in the timing correction module.

2. A timing recovery device as recited in claim 1, wherein the A/D converter samples at a fixed rate.

3. A timing recovery device, as recited in claim 1, further including more than one linear predictor using coefficients.

4. A timing recovery device, as recited in claim 3, further including a demultiplexer coupled between the timing correction module and the linear predictor for separating the time-corrected signal into two or more sub-sampled signals.

5. A timing recovery device, as recited in claim 4, wherein the more than one linear predictors employ substantially the same coefficients to filter each sub-sampled signal.

6. A device as in claim 1, wherein the timing update module processes the whitened sub-sampled signals using band-edge timing techniques.

7. A device as in claim 3, wherein the output of the timing correction module is sampled at an integer multiple of Nyquist rate of the sampled input signal, and outputs of each of the linear predictors are sampled at the Nyquist rate of the sampled input signal.

8. A device as in claim 3, further comprising a symbol-spaced equalizer coupled to the timing recovery module for processing one of the linear predictor outputs.

9. A device as in claim 1, wherein the linear predictor uses an "all-zero" configuration.

10. A device as in claim 1, wherein the linear predictor uses an "all-pole" configuration.

11. A timing recovery device for use in a receiver of a communication system, comprising:
    a linear predictor responsive to a sampled input signal and adapted to generate a whitened output signal; and
    a timing update module responsive to the whitened output signal for adjusting the sampling rate of said sampled input signal.

12. A timing recovery device, as recited in claim 11, further including more than one linear predictor using coefficients.

13. A timing recovery device, as recited in claim 12, further including a demultiplexer coupled between the timing correction module and the linear predictor for separating the time-corrected signal into two or more sub-sampled signals.

14. A timing recovery device, as recited in claim 13, wherein the more than one linear predictors employ substantially the same coefficients to filter each sub-sampled signal.

15. A device as in claim 11, wherein the timing update module processes the whitened sub-sampled signals using band-edge timing techniques.

16. A device as in claim 12, wherein
    the output of the timing correction module is sampled at an integer multiple of Nyquist rate of the sampled input signal, and
    outputs of each of the linear predictors are sampled at the Nyquist rate of the sampled input signal.

17. A device as in claim 12, further comprising a symbol-spaced equalizer coupled to the timing recovery module for processing one of the linear predictor outputs.

18. A device as in claim 11, wherein the linear predictor uses an "all-zero" configuration.

19. A device as in claim 11, wherein the linear predictor uses an "all-pole" configuration.

20. A timing recovery method comprising:
    receiving a sampled signal, wherein the sampling rate of the signal is not synchronized to a transmitter;
    re-sampling said sampled signal at a rate synchronized to said transmitter, to generate a time-corrected signal;
    whitening said time-corrected signal using linear prediction techniques, to generate a whitened signal; and
    updating at least one parameter for a subsequent re-sampling step.

21. A timing recovery method, as recited in claim 20, further including extracting timing information from the whitened signal.

22. A timing recovery method comprised of the following steps:
    receiving a sampled signal, wherein the sampling rate of the signal is not synchronized to a transmitter;
    re-sampling said sampled signal at a rate synchronized to said transmitter to generate a time-corrected signal;
    demultiplexing said time-corrected signal to generate two or more sub-sampled signals;
    whitening said sub-sampled signals using linear prediction techniques to generate two or more whitened sub-sampled signals; and
    updating at least one parameter for a subsequent re-sampling step.

23. A timing recovery method, as recited in claim 22, further including extract timing information from said whitened sub-sampled signals.

24. A timing recovery method comprising:
receiving a sampled signal, wherein the sampling rate of the signal is synchronized to a transmitter;
whitening said sampled signal using linear prediction techniques, to generate a whitened signal; and
updating the sampling rate of said sampled signal.

25. A timing recovery method, as recited in claim 24, further including extracting timing information from the whitened signal.

26. A timing recovery method comprised of the following steps:
receiving a sampled signal, wherein the sampling rate of the signal is synchronized to a transmitter;
demultiplexing said sampled signal to generate two or more sub-sampled signals;
whitening said sub-sampled signals using linear prediction techniques to generate two or more whitened sub-sampled signals; and
updating the sampling rate of said sampled signal.

27. A timing recovery method, as recited in claim 26, further including extract timing information from said whitened sub-sampled signals.

28. A timing recovery method, as recited in claim 20, wherein the at least one parameter is a interpolation phase and frequency, interpolation filter coefficients or an index to a table of interpolation filters.

29. A timing recovery device, as recited in claim 1, further including a adjustable rate sampling clock coupled to receive input from the timing update module and to generate output to the A/D converter, the adjustable rate sampling clock operative to generate adjustable rate sampling clock to the A/D converter for sampling of an input signal.

* * * * *